(12) United States Patent
Kim

(10) Patent No.: US 6,247,564 B1
(45) Date of Patent: Jun. 19, 2001

(54) AUTOMOTIVE SUSPENSION LOCKING DEVICE

(75) Inventor: Gi-Tae Kim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/597,948

(22) Filed: Jun. 20, 2000

(30) Foreign Application Priority Data

Dec. 3, 1999 (KR) .................................... 99-54762

(51) Int. Cl.⁷ .................. F16F 9/32; F16F 9/56; F16F 9/58; F15B 15/26
(52) U.S. Cl. ............ 188/300; 267/64.12; 92/28; 303/2; 188/271; 188/77 R
(58) Field of Search ..................... 188/300, 271, 188/249, 259, 77, 343, 74–76, 67; 267/64.12, 196, 120; 280/754, 149.2; 303/2–3, 22.5; 180/24.02; 92/17, 28; 16/82

(56) References Cited

U.S. PATENT DOCUMENTS

| 1,848,775 | * | 3/1932 | Girling . | |
|---|---|---|---|---|
| 2,868,482 | * | 1/1959 | Westcott, Jr. . | |
| 3,658,159 | * | 4/1972 | Mallinger . | |
| 3,756,354 | * | 9/1973 | Clark | 188/77 R |
| 4,015,862 | * | 4/1977 | Bahrman et al. | 188/300 |
| 4,067,417 | * | 1/1978 | Ostrowski | 188/343 |
| 4,449,702 | * | 5/1984 | Hasagawa | 188/300 |
| 4,930,373 | * | 6/1990 | Nakawaki et al. | 188/77 R |
| 5,103,944 | * | 4/1992 | Severinsson . | |
| 5,331,718 | * | 7/1994 | Gilbert et al. | 267/64.12 |
| 5,505,475 | * | 4/1996 | Turner | 280/149.2 |
| 5,575,448 | * | 11/1996 | Battocchio | 267/64.12 |
| 6,178,870 | * | 1/2001 | Takahashi | 92/28 |

FOREIGN PATENT DOCUMENTS

| 2540402 | * | 3/1977 | (DE) . |
| 19806498 | * | 8/1999 | (DE) . |
| 19806500 | * | 8/1999 | (DE) . |

\* cited by examiner

Primary Examiner—Douglas C. Butler
(74) Attorney, Agent, or Firm—Christie, Parker & Hale, LLP

(57) ABSTRACT

An automotive suspension-locking device mounted to a shock absorber having a cylinder and a piston rod, the suspension-locking device includes a brake band provided around the piston rod of the shock absorber for locking and unlocking the shock absorber, structure for controlling the brake band, the control structure being connected to both end portions of the brake band, and an actuator connected to the control structure by a piston rod thereof for actuating the control structure.

7 Claims, 3 Drawing Sheets

AUTOMOTIVE SUSPENSION LOCKING DEVICE

BACKGROUND OF THE INVENTION (a) Field of the Invention

The present invention relates to an automotive suspension-locking device for preventing a vehicle suspension from bouncing while passengers get on or off.

(b) Description of the Related Art

An air suspension is adapted to a heavy weight vehicle like a bus because its shock absorbing efficiency is superior to other types of suspensions. Typically, the air suspension system comprises an air chamber filled with compressed air and a piston rod for constituting an air spring and a shock absorber. The air spring has a low elastic modulus and low damping force so as to be used for a high volume shock absorber.

However, the air suspension has drawbacks in that a vehicle equipped with the air suspension bounces up and down when the passengers get on or off when the vehicle is stopped, because it adapts an air spring mechanism having a low elastic modulus and a low damping force.

SUMMARY OF THE INVENTION

The present invention has been made in an effort to solve the above problems of the prior art.

It is an object of the present invention to provide an automotive air suspension-locking device for preventing a vehicle from bouncing up and down when passengers get on or off the vehicle.

To achieve the above object, the automotive suspension-locking device is mounted to a shock absorber having a cylinder and a piston rod, the suspension-locking device comprising, a brake band provided around the piston rod of the shock absorber for locking and unlocking the shock absorber, a means for controlling the brake band, the control means being connected to both end portions of the brake band, and an actuator connected to the control means by means of a piston rod thereof for actuating the control means.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 3b is a top view showing the automotive suspension-locking device of FIG. 3a;

FIG. 4b is a top view showing the automotive suspension-locking device of FIG. 4a.

DETAILED DESCRIPTION OF THE PREFERRED EMBODIMENTS

A preferred embodiment of the present invention will be described hereinafter with reference to the accompanying drawings.

Figure 1:
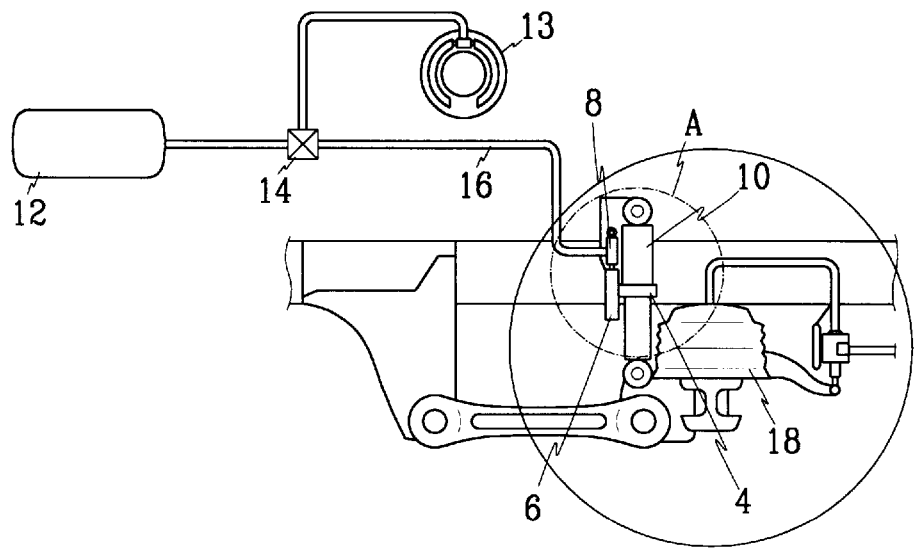
FIG. 1 is a schematic view showing an automotive suspension-locking device affixed to a suspension according to a preferred embodiment of the present invention.
Figure 2:
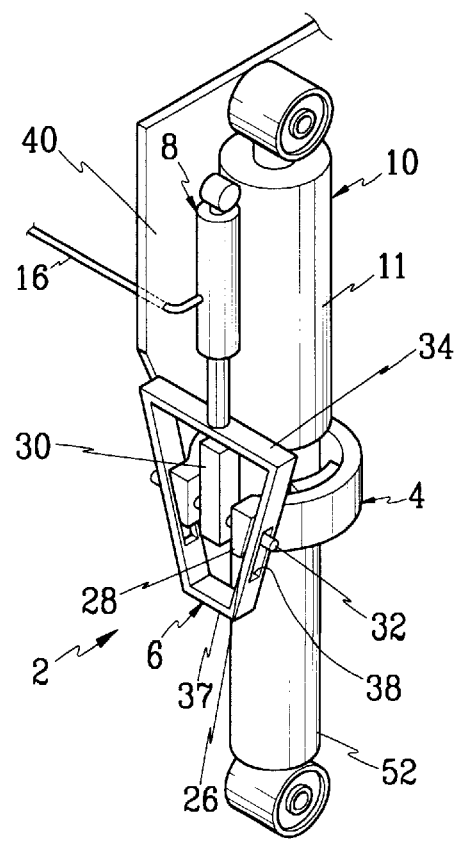
FIG. 2 is an enlarged perspective view of part A of FIG. 1.

FIG. 1 is a schematic view showing an air suspension equipped with the automotive suspension-locking device, and FIG. 2 is an enlarged perspective view of part A of FIG. 1 according to a preferred embodiment of the present invention.

As shown in FIG. 1, the suspension-locking device 2 comprises: a brake band 4 provided around an upper part of a piston rod 52 of a shock absorber 10, the brake band 4 having a flange 28 at each end; a trapezoidal bracket 6 with its longer parallel side above its shorter parallel side, and having a slot 38 on each non-parallel side which allow interlocking of the flanges 28 of the brake band 4 thereto by means of a pin 32; and an actuator 8 fixedly mounted to a cylinder 11 of the shock absorber 10 and connected to a top side of the trapezoidal bracket 6 so as to actuate as well as support the bracket 6.

The brake band 4 comprises a pair of steel strips connected to each other at one end of each both strip and supported by a support 30 integrally formed with the cylinder 11 of the shock absorber 10 at the other end, in such a way that the pin 32 connects the brake band 4, the trapezoidal bracket 6, and the support 30 (see FIG. 2). The flanges 28 of the brake band 4 are cut at a predetermined angle downwardly on their exterior surfaces so that they fit inside the trapezoid bracket 6. Around the inner wall of the brake band 4, friction members 22 are formed for enhancing brake efficiency.

The trapezoidal bracket 6 is provided with a slot 38 on each non-parallel side so as to receive the pin 32 such that the pin 32 and the slot 38 limit the movement of the trapezoidal bracket 6.

Figure 3A:
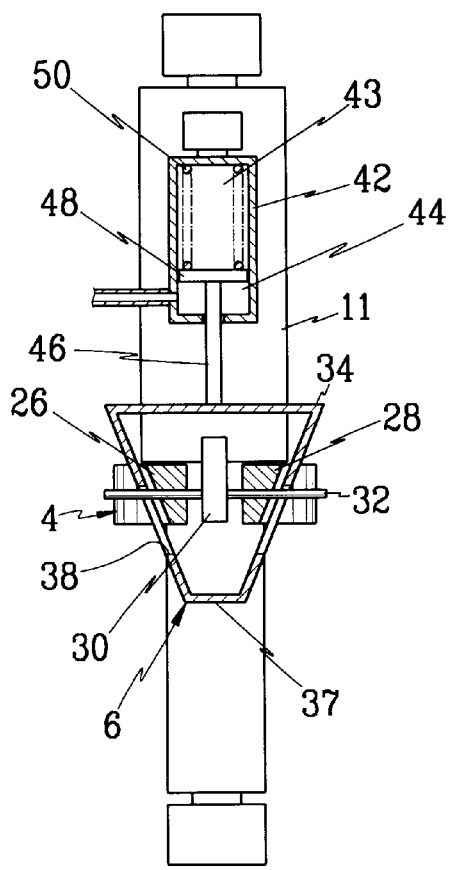
FIG. 3a is a front view showing the automotive suspension-locking device of FIG. 1 while the suspension is unlocked.
Figure 3B:
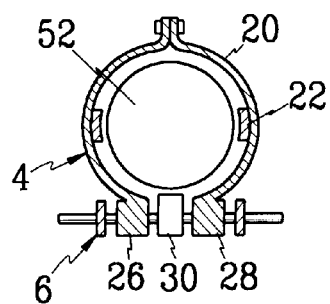
Figure 4A:
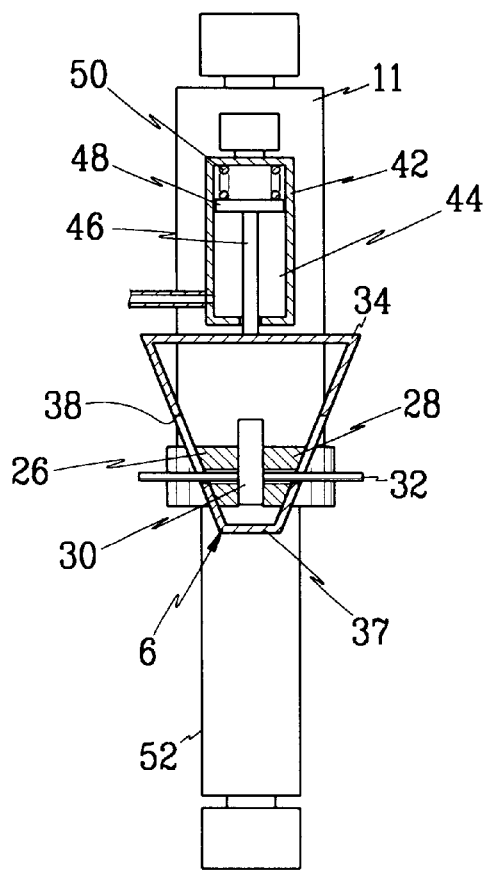
FIG. 4a is a front view showing the automotive suspension-locking device of FIG. 1 while the suspension is locked.
Figure 4B:
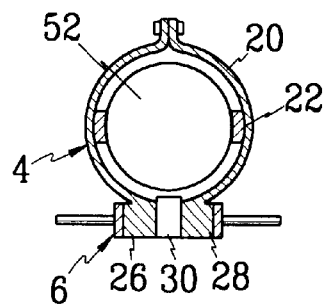

Also, the trapezoidal bracket 6 is connected to one end of a second piston rod 46 of the actuator 8 (See FIG. 3a) at its top side 34 such that the trapezoidal bracket 6 moves up and down according to operation of the actuator 8.

The actuator 8 comprises a second cylinder 42 fixed to the first cylinder 11 of the shock absorber 10, a plunger 48 fittedly inserted into the cylinder 42 so as to divide the space in the cylinder 42 into upper and lower chambers 43 and 44, a second piston rod 46 connected to a lower surface of the plunger 48 at its upper end, and a coil spring inserted into the upper chamber of the cylinder 42 for biasing the plunger 48 downwardly.

Also, the actuator 8 is connected to an air brake valve 14, which controls the air brake 13, by a pressure line 16 to its lower chamber such that air pressure is supplied to the actuator 8 as well as the air brake 13 if the air brake valve 14 is on.

The operation of the automatic air suspension-locking device according to the above-preferred embodiment of the present invention will be described hereinafter.

When a driver manipulates a parking brake lever or button when parking a vehicle equipped with the automatic air suspension-locking device of the present invention, air pressure is supplied to the air brake 13 so as to stop the wheels. At the same time, the air is supplied to the actuator 8 of the automotive suspension-locking device such that the air supplied to the lower chamber 44 of the actuator 8 pushes up the plunger 48 against the elastic force of the coil spring 50. Accordingly, the trapezoidal bracket 6 connected to the plunger 48 by the second piston rod 46 moves upward such that the flanges 28 of the brake band 4 are drawn together as the trapezoidal bracket 6 moves upward. As a result, the brake band 4 seizes the surface of the piston rod 52, resulting in the air suspension being locked.

As described above, since the automotive suspension locking-device of the present invention locks the air suspension of the vehicle when the parking brake is operated, the vehicle is prevented from bouncing by passengers getting on or off.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An automotive suspension-locking device mounted to a shock absorber having a cylinder and a piston rod, the suspension-locking device comprising:

a brake band provided around the piston rod of the shock absorber for locking and unlocking the shock absorber;

means for controlling the brake band, the control means being connected to both end portions of the brake band;

an actuator for actuating the control means, the actuator being connected to the control means by means of a piston rod.

2. An automotive suspension-locking device of claim 1 wherein the brake band comprises a pair of steel strips connected to each other at one end of each strip and a plurality of friction members mounted on the interior surface of the brake band, each free end of the steel strips being provided with a flange.

3. An automotive suspension-locking device of claim 1 further comprising a support integrally formed with the cylinder of the shock absorber for supporting the brake band such that the flanges of the brake band are connected to the support by means of a pin.

4. An automotive suspension-locking device of claim 1 wherein the control means is a trapezoidal bracket with a longer parallel side above a shorter parallel side, and having a slot on each non-parallel side such that the brake band are slidably fitted to the non-parallel sides.

5. An automotive suspension-locking device of claim 4 wherein the flange is cut at an identical angle of the non-parallel sides such that the flange slidably disposed on the non-parallel side along the slot.

6. An automotive suspension-locking device of claim 1 wherein the actuator comprises a cylinder fixed to the shock absorber, a plunger tightly inserted into the cylinder so as to divide a space in the cylinder into upper and lower chambers, a piston rod connected at an upper end to the lower surface of the plunger and at a lower end to a top side of the control means, and a coil spring inserted into the upper chamber of the cylinder for biasing the plunger downwardly.

7. An automotive suspension locking device of claim 1 wherein the actuator is connected to an air brake valve, which controls the air brake of the vehicle, by a pressure line such that air pressure is supplied to the actuator as well as the air brake when the air brake valve is on.

* * * * *